Figure 1:
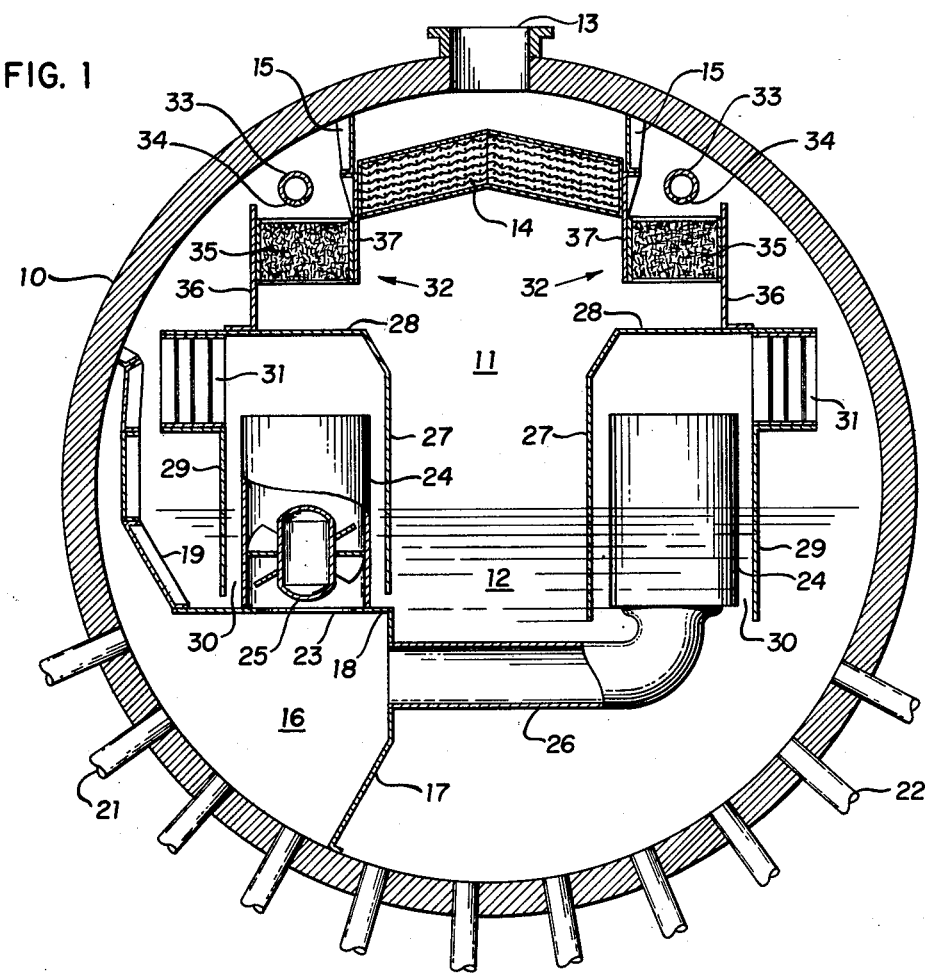

Jan. 12, 1965 P. B. PLACE 3,165,387
METHOD AND APPARATUS FOR REMOVAL OF SILICA VAPOR FROM STEAM
Filed Dec. 27, 1961

INVENTOR:
PALMER B. PLACE
BY
C. F. Bryant
ATTORNEY

United States Patent Office 3,165,387
Patented Jan. 12, 1965

3,165,387
METHOD AND APPARATUS FOR REMOVAL
OF SILICA VAPOR FROM STEAM
Palmer B. Place, Chattanooga, Tenn., assignor to Combustion Engineering, Inc., Windsor, Conn., a corporation of Delaware
Filed Dec. 27, 1961, Ser. No. 162,389
4 Claims. (Cl. 55—90)

The present invention relates to a novel means and method for purifying steam and more particularly to a washing apparatus for removing vaporous impurities such as silica vapor from high pressure steam produced in a steam generator.

It has long been known that the steam produced in high pressure steam generators contains both solid and vaporous impurities. While the mechanical separating means employed in such generators are capable of removing the solid impurities associated with the moisture entrained in the steam such means cannot remove those impurities which exist in vaporous form. As a result, these impurities are carried to the turbine or other work producing means where their deleterious effects are realized.

Silica is one of the forms of impurities prevalent in high pressure steam. It is found dissolved in the boiler water and forms silicic acids which have sufficient vapor pressure in alkaline solution to result in the vaporization of a small fraction of the silica. When mixed with the generated steam, the vaporized silica cannot be separated by mechanical separator devices and thus is carried over to the turbine or other work performing means where the pressure and temperature of the steam as well as that of the vaporized impurities are reduced causing the solubility of the silica in the steam to be lowered thereby resulting in the formation of solid deposits of silica on the internals of the turbine or other such devices. Such deposits ultimately result in the complete shutdown of the work producing unit so that the internals thereof can be cleaned or replaced.

It has been found that removal of vaporous silica from steam can be achieved by contacting steam created in the generator with relatively pure water which absorbs the silica from the steam and returns it to the boiler water in the system where it can be ultimately removed by blowdown. The steam which emerges from the generator unit after washing is therefore rendered substantially free of harmful contaminants.

In order to achieve a high efficiency of silica removal the following factors must be considered. Firstly the wash water employed must be of a relatively high purity so as to permit maximum absorption of silica in the steam. Secondly, there must be provided means to effect the intimate contact of all of the steam with the wash water.

Silica removal from steam is dependent upon the differential concentration of silica in the wash water as against that carried in the steam. Therefore the amount of silica which can be removed from the steam passing through the washer varies with either the amount of wash water passing through the unit or the purity of the wash water, or both. Where the amount of water which can be handled by a washer unit is limited, more care must be taken to insure that the purity of the wash water be such as will reduce the silica concentration in the steam to acceptable limits. By the same token, where a great amount of wash water can be employed in a washer the requisite degree of purity of the water can be reduced.

A most convenient method of operating a steam washer in a steam generator unit is to employ as the washing medium the feedwater being fed to the generator. In such units the feedwater is fed first to the washer where it serves to wash the steam and then to the steam generator tubes where it is transformed into steam. While such a concept is employed in washers of existing design its use is limited by the fact that, if excessive amounts of wash water are employed in the washer there is a danger that the water will be carried by the steam into the screen drier located at the steam outlet causing flooding of the drier thereby rendering it ineffective to dry the steam passing therethrough. Due to the lack of available space within the steam and water drum which houses the washing apparatus and the drier it is virtually impossible to provide sufficient space between the washer and the drier in order to prevent carryover of water to the drier when large amounts of water are employed in the washer. Therefore, in order to employ conventional steam washing units within a steam and water drum which houses the steam drier it is necessary to limit the amount of water admitted to the washer. This renders it difficult to admit all of the feedwater to the washer, especially at high steam generator loads where a large amount of feedwater is being fed to the drum.

By means of the present invention a novel steam washer apparatus and method are provided which permits utilization of all of the feedwater being fed to the steam generator with no danger of carryover to and flooding of the steam drier.

It is therefore a principle object of the present invention to provide novel apparatus and method which will efficiently remove substantially all of the entrained vaporous silica from the high pressure steam produced in a steam generator.

It is also an object of the present invention to provide a compact steam washing means and method incorporating each of the aforementioned essentials for efficient steam purification.

A still further object of the invention is to provide a compact steam washing apparatus and method which can be arranged within the confines of the liquid and vapor drum of existing steam generators.

An additional object of the invention is to provide a compact steam washing apparatus and method which are capable of utilizing all of the feedwater being fed to the steam generator unit.

Figure 2:
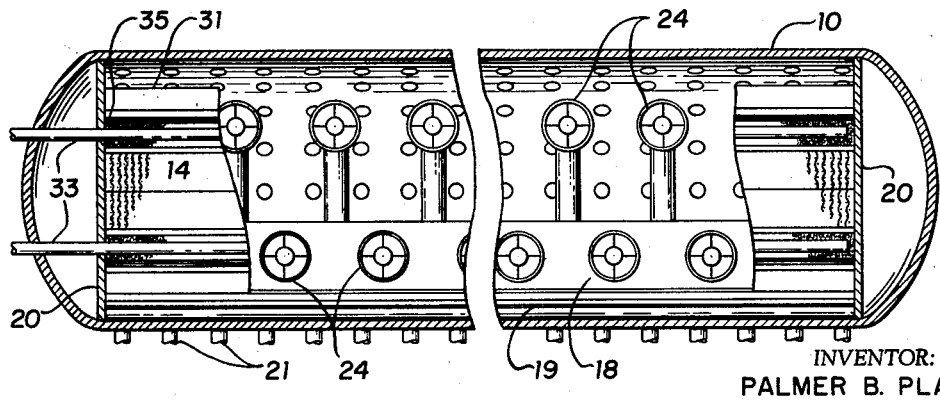

Additional objects and advantages will become apparent from the illustrative description when read in conjunction with the following drawing in which:

FIGURE 1 is a transverse section of a vapor and liquid drum incorporating a steam washer of the present invention; and FIGURE 2 is a reduced plan view of the steam and water drum arrangement shown in FIGURE 1.

Referring to FIGURE 1 there is shown the steam and water drum 10 of a steam generator unit comprising an upper steam space 11 and a lower water space 12 defined by the normal level of boiler water in the drum. Conduit 13 is positioned at the top of the drum communicating with steam space 11 providing a means for delivering the steam created in the steam generator to a steam-utilizing device. A screen drier 14 is positioned in the steam path closely adjacent the steam outlet 13 and secured in place by means of a plurality of brackets 15 which are attached to the inner surface of the drum. Along the lower left-hand portion of the drum 10, as viewed in FIGURE 1, is provided a plurality of structural members 17 through 19 which form a chamber 16 extending along substantially the entire length of the drum. Circular end plates 20 (FIGURE 2) are attached at either end of chamber 16 and to the inner surface of the drum thereby isolating the chamber from the remainder of the drum interior.

Steam generator tubes 21 communicate with the chamber 16 and deposit a steam and water mixture which has been created in the furnace portion of the steam generator into the chamber. Downcomer tubes 22 communicate with the water space 12 of drum 10 and provide means for recycling water which falls to the lower portion of the drum through the steam generator.

The separators shown in FIGURE 1 comprise an elongated cylindrical can 24 having a swirl inducing baffle means 25 positioned at the inlet thereof which imparts a rotary movement to a steam and water mixture passing therethrough thereby removing by centrifugal action the heavy elements contained in the mixture. These elements, consisting of water and solid entrainments found in the mixture are discharged from the outlet of the separator and fall into the drum water space 12. The disclosed centrifugal separators are of a type similar to that described in U.S. Patent 2,646,397 to Ravese et al., of August 11, 1953.

Communicating with chamber 16 through the chamber side wall partition 17 is a row of crossover tubes 26 which permit passage of a portion of the steam and water mixture to a row of similar separators which line the right hand side of the drum 10.

Each row of separators is enveloped by a plurality of partitions 27 through 29 which partially surround the separators forming discharge passages 30 through which the discharge from the separators is directed toward the water space 12. Secondary separator means comprising a plurality of closely spaced, corrugated plates 31 is positioned between partitions 28 and 29 and is attached thereto. The secondary separator provides a means for further segregation of the vapor which emerges from the centrifugal separators. Discharge from the corrugated plates 31 falls to the water space 12.

Overlying the row of separator units is a steam washer unit 32. The steam washer unit 32 comprises a wash water inlet means 33 and an elongated mass of closely compacted wire mesh matting 35. The material forming the wire mesh matting 35 is supported by structural members 36 and 37 which constitute a frame therefor with the respective members being attached to member 28 and screen drier support 15.

The wash water inlet means comprises an elongated tube 33 having a plurality of longitudinally spaced apertures 34 which permit incoming wash water to be directed downwardly into the matt 35. The wire mesh matt is preferably formed of a plurality of layers of Goodloe wire mesh packing, the thickness being approximately from 2 to 3 inches. The matt is constructed of light gauge stainless steel wire which forms a loosely woven mesh. The mesh is compacted to a density of approximately 12 pounds per cubic foot while maintaining a free area of approximately 90 percent. Such a matt structure gives the steam ample room to freely pass through the washer yet also provides a means whereby the steam will be compelled to come in contact with the wash water which flows though the matt.

The washer unit 32 is located in the steam path between the outlet of the secondary separator and the drier 14 in such a manner that steam emerging from the secondary separator is caused to pass upwardly over structural member 36 and then downwardly through the matting 35 where it emerges into the steam space 11. The wash water which gravitationally emerges from the tube 33 is deposited on to the matt 35 and flows through it comingling with the steam passing therethrough thereby effecting an absorption of the vaporous silica impurities in the steam. The water emerging from the washer 32 because it is heavier than the steam emerging therefrom, is directed downwardly by means of structural members 27 and 28 into the water space 12 where it can be recycled through the generator. The steam which flows into steam space 11, because it is less dense than the water, flows upwardly through the screen drier 14 and emerges through steam outlet 13 as a substantially pure, dry vapor. By directing the steam into the low velocity steam space 11 and compelling it to abruptly change its direction in order to flow upwardly out of the steam outlet 13 a portion of the water entrained in the steam is caused to be gravitationally removed therefrom thereby decreasing the load on the screen drier 14 and permitting the drier 14 to receive steam of such a water content that the drier is capable of handling without becoming flooded.

The operation of the device is as follows. The steam and water mixture generated in the steam generator unit is deposited into the chamber 16 by means of the riser tubes 21 from whence it passes through the dual rows of separator apparatus, emerging therefrom as substantially dry steam. The steam rises toward the top of the drum around the inner surface thereof and is directed toward the upper surface of matting 35. At this point relatively pure feedwater which is supplied to the unit by means of elongated tube 33 gravitationally emerges therefrom through apertures 34 and falls downwardly into the steam flow path and through the washer matt material 35. The water which emerges from the washer is directed toward the water space 12 by means of the baffle plates 27 and 28 and the steam which emerges from the washer is directed upwardly due to its lesser density through the screen drier 14 which removes any liquid which may be retained in the steam therefrom. The steam which emerges from the steam outlet is therefore substantially pure, dry steam.

The steam washer unit of the instant invention achieves a steam washing efficiency of high order. Steam emerging from the steam outlet exhibits a reduction of vapor content from between 80 and 90 percent. Efficiency of this order is attributed to the purity of the wash water and the amount of wash water utilized. The downward flow of steam and wash water in a direction away from the steam drier 14 obviates any danger of flooding the screen drier when excessive amounts of wash water are directed into the matting. Such a feature makes it possible to use all of the feedwater being fed to the steam generator as a steam washing medium thereby obviating the necessity having to provide means to direct only a portion of the feedwater to the wash water unit.

While there has been disclosed a particular embodiment of the invention this disclosure is intended to merely illustrate and not to limit the inventive concept. It is understood that changes may be made in the form of the apparatus disclosed without departing from the spirit of the invention covered by the appended claims.

What is claimed is:

1. In combination with a vapor and liquid drum having an inlet for introducing a vapor and liquid mixture thereto and a vapor outlet opening positioned in the upper portion of said drum including a screen drier positioned closely adjacent to and extending across said vapor outlet opening, vapor purifying apparatus comprising separator means including a mixture inlet communicating with the drum inlet and a vapor outlet adapted to remove liquid particles from said mixture, a vapor washer interposed between said separator means and said screen drier, means forming an expansion space providing a low velocity vapor space between said washer and said screen drier, said vapor washer comprising an inlet in communication with said separator means vapor outlet, a vapor washer outlet positioned below said vapor washer inlet, means for effecting the intimate contact of vapor and wash water positioned between said washer inlet and outlet, means positioned above said inlet for gravitationally supplying wash water to said contact-effecting means in a direction cocurrent with downwardly flowing vapor through said washer and in contact therewith, said screen drier being positioned above said washer outlet whereby said washer outlet communicates with said low velocity vapor space in a direction away from said screen drier thereby causing the vapor discharge from said washer outlet to undergo an abrupt change of direction in said low velocity vapor space ahead of said screen drier.

2. In combination with a vapor and liquid drum having an inlet for introducing a vapor and liquid mixture thereto and a vapor outlet opening positioned in the upper portion of said drum including a screen drier positioned closely adjacent to and extending across said vapor outlet opening, vapor purifying apparatus comprising separator means including a mixture inlet communicating with the drum inlet and a vapor outlet adapted to remove liquid particles from said mixture, a vapor washer interposed between said separator means and said screen drier, means forming an expansion space providing a low velocity vapor space between said washer and said screen drier, said vapor washer comprising an inlet in communication with said separator means vapor outlet, a vapor washer outlet positioned directly below said vapor washer inlet, a mass of woven wire mesh for effecting the intimate contact of vapor and wash water positioned between said washer inlet and outlet, means positioned above said washer inlet for gravitationally supplying wash water to said woven wire mesh in a direction cocurrent with downwardly flowing vapor through said washer and in contact therewith, said screen drier being positioned above said washer outlet whereby said washer outlet communicates with said low velocity vapor space in a direction away from said screen drier thereby causing the vapor discharged from said washer outlet to undergo an abrupt change of direction in said low velocity vapor space ahead of said screen drier.

3. In combination with a vapor and liquid drum having an inlet for introducing a vapor and liquid mixture thereto and a vapor outlet opening positioned in the upper portion of said drum including a screen drier positioned closely adjacent to and extending across said vapor outlet opening, vapor purifying apparatus comprising separator means including a mixture inlet communicating with the drum inlet and a vapor outlet adapted to remove liquid particles from said mixture, a vapor washer interposed between said separator means and said screen drier, means forming an expansion space providing a low velocity vapor space between said washer and said screen drier, said vapor washer comprising an inlet in communication with said separator means vapor outlet, a vapor washer outlet positioned directly below said vapor washer inlet, a mass of woven wire mesh for effecting the intimate contact of vapor and wash water positioned between said washer inlet and outlet, means positioned above said washer inlet for gravitationally supplying wash water so said woven wire mesh in a direction cocurrent with downwardly flowing vapor through said washer and in contact therewith, said screen drier being positioned above said washer outlet whereby said washer outlet opens into said low velocity vapor space below and in a direction away from said screen drier thereby causing the vapor discharged from said washer outlet to undergo an abrupt change of direction in said low velocity vapor space ahead of said screen drier.

4. A method of removing vaporous impurities including slica vapor from vapor and liquid mixture supplied to the vapor and liquid drum of a vapor generator having an elevated vapor outlet and a screen drier located immediately therebelow comprising the steps of mechanically separating liquid particles from said mixture, passing the separated vapor downwardly through a mass of woven wire mesh the lowest portion of which is positioned below said screen drier while simultaneously directing wash water downwardly into said mass of woven wire mesh cocurrent with the flow of said vapor and in contact therewith to remove vaporous impurities including silica vapor, discharging the washed vapor downwardly into an expansion space providing a low velocity vapor space in a direction away from said screen drier and gravitationally separating particles of wash water entrained in said vapor by the abrupt upward change of direction the vapor makes before it enters said screen drier, discharging the spent wash water in a direction away from said screen drier and thereafter drying said vapor in said screen drier.

References Cited in the file of this patent

UNITED STATES PATENTS

| | | |
|---|---|---|
| 2,648,397 | Ravese et al. | Aug. 11, 1953 |
| 2,875,992 | Pirsh et al. | Mar. 3, 1959 |
| 2,895,566 | Coulter | July 21, 1959 |
| 3,006,436 | Starbuck | Oct. 31, 1961 |
| 3,022,859 | Sexton | Feb. 27, 1962 |